(12) United States Patent
Dorta-Quinones et al.

(10) Patent No.: US 11,409,045 B2
(45) Date of Patent: Aug. 9, 2022

(54) PHOTONICS STABILIZATION CIRCUITRY

(71) Applicant: Lightmatter, Inc., Boston, MA (US)

(72) Inventors: Carlos Dorta-Quinones, Medford, MA (US); Carl Ramey, Westborough, MA (US); Omer Ozgur Yildirim, Wellesley, MA (US); Chithira Ravi, Somerville, MA (US); Shashank Gupta, Newton, MA (US); Nicholas C. Harris, Boston, MA (US)

(73) Assignee: Lightmatter, Inc., Boston, MA (US)

(*) Notice: Subject to any disclaimer, the term of this patent is extended or adjusted under 35 U.S.C. 154(b) by 0 days.

(21) Appl. No.: 16/918,196

(22) Filed: Jul. 1, 2020

(65) Prior Publication Data

US 2021/0003904 A1 Jan. 7, 2021

Related U.S. Application Data

(60) Provisional application No. 62/869,690, filed on Jul. 2, 2019.

(51) Int. Cl.
*G02B 6/293* (2006.01)
*G02F 1/01* (2006.01)
*G02B 6/12* (2006.01)

(52) U.S. Cl.
CPC ...... *G02B 6/29338* (2013.01); *G02B 6/12033* (2013.01); *G02B 6/29395* (2013.01); *G02B 2006/12135* (2013.01); *G02B 2006/12138* (2013.01); *G02F 1/0118* (2013.01); *G02F 2203/21* (2013.01)

(58) Field of Classification Search
None
See application file for complete search history.

(56) References Cited

U.S. PATENT DOCUMENTS

| 5,691,700 | A | 11/1997 | Phelps et al. |
| 7,573,210 | B2 | 8/2009 | Ashdown et al. |
| 7,718,948 | B2 | 5/2010 | Kiesel et al. |
| 7,977,622 | B2 | 7/2011 | McLaren et al. |
| 9,097,526 | B1 * | 8/2015 | Sanders ............ G01C 19/721 |

(Continued)

FOREIGN PATENT DOCUMENTS

WO 2019/131804 A1 7/2019

OTHER PUBLICATIONS

Invitation to Pay Additional Fees for International Application No. PCT/US2020/040428, dated Sep. 18, 2020.

(Continued)

*Primary Examiner* — Michael Stahl
(74) *Attorney, Agent, or Firm* — Wolf, Greenfield & Sacks, P.C.

(57) ABSTRACT

Methods and apparatus for tuning a photonics-based component. An opto-electrical detector is configured to output an electrical signal based on a measurement of light intensity of the photonics-based component, the light intensity being proportional to an amount of detuning of the photonics-based component. Analog-to-digital conversion (ADC) circuitry is configured to output a digital signal based on the electrical signal output from the opto-electrical detector. Feedback control circuitry is configured to tune the photonics-based component based, at least in part, on the digital signal output from the ADC circuitry.

27 Claims, 5 Drawing Sheets

(56) References Cited

U.S. PATENT DOCUMENTS

| | | |
|---|---|---|
| 2002/0126479 A1 | 9/2002 | Zhai et al. |
| 2005/0013332 A1 | 1/2005 | Kish et al. |
| 2006/0056480 A1 | 3/2006 | Mielke et al. |
| 2006/0182441 A1 | 8/2006 | Kish, Jr. et al. |
| 2006/0198415 A1* | 9/2006 | Yamazaki .......... G02B 6/12007 372/94 |
| 2011/0249936 A1 | 10/2011 | Welch et al. |
| 2015/0341122 A1* | 11/2015 | Toda .................... G02F 1/0121 398/182 |
| 2017/0302398 A1 | 10/2017 | Yin et al. |
| 2018/0084320 A1 | 3/2018 | Martinho et al. |
| 2018/0366915 A1 | 12/2018 | Zilkie et al. |
| 2019/0324298 A1* | 10/2019 | Dayel ................... G02F 1/0123 |
| 2019/0391335 A1* | 12/2019 | Tan ..................... G05D 23/1934 |
| 2021/0286128 A1 | 9/2021 | Harris |

OTHER PUBLICATIONS

International Search Report and Written Opinion dated Nov. 18, 2020 in connection with International Application No. PCT/US2020/040428.

International Search Report and Written Opinion dated Jun. 9, 2021 in connection with International Application No. PCT/US2021/022434.

International Preliminary Report on Patentability dated Jan. 13, 2022 in connection with International Application No. PCT/US2020/040428.

* cited by examiner

PHOTONICS STABILIZATION CIRCUITRY

RELATED APPLICATIONS

This application claims priority under 35 U.S.C. § 119(e) to U.S. Provisional Application No. 62/869,690, filed Jul. 2, 2019, and titled "Ring/Disk Resonator Stabilization," the entire contents of which is incorporated by reference herein.

BACKGROUND

In silicon photonics, a ring/disk resonator is one of the most versatile components used in a variety of applications. A common usage of the ring/disk resonator includes evanescent coupling of light from a bus waveguide into the ring/disk. In this configuration, the transmission spectrum of the bus waveguide shows dips at ring resonances and hence can be used as a high-quality spectral filter or a sensor. Coupled with an electrical input, e.g., from a p-n junction or a thermal resistor, a ring/disk resonator also operates as a high speed electro-optic modulator. The ring/disk resonator is also an attractive choice for optical delay lines because of the large group delay resulting from a strong dispersion close to resonance.

SUMMARY

Aspects of the present application relate to circuitry and techniques for stabilizing operation of a photonics component. For instance, in some embodiments, variations in temperature cause undesirable phase shifts in a ring/disk resonator resulting in a detuning of the resonator. The circuitry and techniques described herein provide for high-accuracy detection of the detuning and high-precision modulation of one or more characteristics of the photonics component to correct for the undesirable effects.

Some embodiments relate to a device, comprising an opto-electrical detector configured to output an electrical signal based on a measurement of light intensity of a photonics-based component, the light intensity being proportional to an amount of detuning of the photonics-based component, analog-to-digital conversion (ADC) circuitry configured to output a digital signal based on the electrical signal output from the opto-electrical detector, and feedback control circuitry configured to tune the photonics-based component based, at least in part, on the digital signal output from the ADC circuitry.

In some aspects, the photonics-based component is a ring resonator.

In some aspects, the photonics-based component includes a viewport, and the opto-electrical detector comprises a photodetector configured to detect a light intensity through the viewport.

In some aspects, the device further comprises a digital controller configured to receive the digital signal output from the ADC circuitry, generate a digital pulse sequence based, at least in part, on the received digital signal, and provide the digital pulse sequence to the feedback control circuitry.

In some aspects, the ADC circuitry further comprises an integrating capacitor configured to integrate at least a portion of the electrical signal output from the opto-electrical detector prior to conversion to a digital signal.

In some aspects, the digital controller is further configured to set an integration time of the integrating capacitor.

In some aspects, the ADC circuitry further comprises a first analog multiplexer configured to subtract an offset value from the electrical signal output from the opto-electrical detector prior to integration by the integrating capacitor.

In some aspects, the ADC circuitry further comprises a second analog multiplexer arranged between an output of the first analog multiplexer and the integrating capacitor.

In some aspects, the ADC circuitry further comprises multi-stage amplification circuitry configured to amplify a voltage stored by the integrating capacitor.

In some aspects, the ADC circuitry comprises a dual-slope integrating ADC.

In some aspects, the digital controller comprises a counter.

In some aspects, the feedback control circuitry comprises pulse width modulation (PWM) circuitry coupled to a digital-to-analog converter (DAC).

In some aspects, the DAC has a resolution less than or equal to 8-bits.

In some aspects, the PWM circuitry is configured to perform code dithering.

In some aspects, the digital controller is configured to control at least one parameter of the code dithering performed by the PWM circuitry.

In some aspects, the feedback control circuitry is configured to tune the photonics-based component by controlling a temperature of the photonics-based component.

In some aspects, the feedback control circuitry is configured to control the temperature of the photonics-based component by introducing a phase shift in the photonics-based component.

In some aspects, the feedback control circuitry includes a modulator that provides at least one of an electro-optic effect and a thermal phase shift in the photonics-based component.

In some aspects, the modulator includes at least one of a resistor, a p-n junction, and a p-i-n junction.

In some aspects, the feedback control circuitry is configured to accurately control a temperature of the photonics-based component to within 0.001 degrees Celsius.

In some aspects, the feedback control circuitry is configured to have a precision of one part per 50000 in applied power.

In some aspects, the feedback control circuitry is configured to tune the photonics-based component based on a time-averaged power generated by the feedback control circuitry.

In some aspects, the ADC circuitry is configured to have a current sensitivity in the nanoampere range.

Some embodiments relate to a method of stabilizing a photonics-based component. The method comprises generating a first electrical signal based on a detected light intensity proportional to an amount of detuning of the photonics-based component, subtracting from the first electrical signal, an offset value to produce a second electrical signal, amplifying the second electrical signal, generating a digital signal based on the amplified second electrical signal, and tuning the photonics-based component based, at least in part, on the generated digital signal.

In some aspects, the photonics-based component is a ring resonator.

In some aspects, the method further comprises generating a digital pulse sequence based, at least in part, on the digital signal, and tuning the photonics-based component based, at least in part, on the generated digital pulse sequence.

In some aspects, the method further comprises integrating at least a portion of the first electrical signal prior to generating the digital signal.

In some aspects the method further comprises dynamically setting an integration time during which the integrating of the first electrical signal is performed.

In some aspects, amplifying the second electrical signal comprises performing multi-stage amplification.

In some aspects, the method further comprises performing code dithering based on the generated digital signal.

In some aspects, tuning the photonics-based component comprises controlling a temperature of the photonics-based component.

In some aspects, controlling the temperature of the photonics-based component comprises introducing a phase shift in the photonics-based component.

Some embodiments relate to a device comprising a photonics-based ring resonator, an opto-electrical detector that measures light intensity of the ring resonator at certain periods, a precision circuit that generates a precision signal from the measured light intensity representative of temperature fluctuations in the ring resonator, and a feedback control circuit that controls a temperature of the ring resonator.

In some aspects, the feedback control circuit controls the temperature of the ring resonator accurately to within 0.001 degrees Celsius.

In some aspects, the precision circuit includes a dual slope integrating analog-to-digital converter (ADC).

In some aspects, the feedback control circuit includes a low-precision digital-to-analog converter (DAC) and code dithering circuitry.

In some aspects, the feedback control circuit includes a temperature controller coupled to the ring resonator. In some aspects, the temperature controller includes an element that introduces a phase shift in the ring resonator.

In some aspects, the temperature controller includes an element that provides at least one of an electro-optic effect and a thermal phase shift in the ring resonator.

In some aspects, the temperature controller includes at least one of a resistor, a p-n junction, and a p-i-n junction.

Some embodiments are directed to a method, comprising: measuring an intensity of light output by a photonics-based ring resonator during periodic calibration vectors, generating an electrical signal based on the measured intensity representative of temperature fluctuations in the ring resonator, and through feedback, controlling a temperature of the ring resonator.

In some aspects, the controlling includes controlling the temperature of the ring resonator to within 0.001 degrees Celsius.

In some aspects, the generating includes using a dual-slope integrating analog-to-digital converter (ADC).

In some aspects, the generating includes generating a highly accurate digitized signal with current sensitivity in the nanoampere range.

In some aspects, the generating includes performing analog baseline subtraction to extend a dynamic range of the digitized signal.

In some aspects, the controlling includes driving a control signal into a temperature controller, coupled to the ring resonator.

In some aspects, the temperature controller includes an element that introduces a phase shift in the ring resonator.

In some aspects, the element used to provide temperature control includes at least one of a resistor, a p-n junction or a p-i-n junction.

In some aspects, the controlling includes generating a control signal by performing digital-to-analog conversion (DAC) with a low precision DAC.

In some aspects, the controlling further including performing a code dithering scheme.

In some aspects, the controlling has precision on an order of one part per 50000 in applied power.

Some embodiments are directed to a device comprising a photonics-based ring resonator, an opto-electrical detector that detects light intensity of the ring resonator, a low noise, high precision analog-to-digital converter (ADC) that digitizes signals based on the detected light representative of temperature fluctuations of the ring resonator, a digital feedback circuit that provides a temperature control signal based on the detected light, and a temperature controller, coupled to the ring resonator, that controls a temperature of the ring resonator based on the control signal.

In some aspects, the ADC includes a dual slope integrating ADC.

In some aspects, the ADC generates highly accurate digitized signals with current sensitivity in the nanoampere range.

In some aspects, the feedback circuit includes a low precision digital-to-analog converter (DAC).

In some aspects, the feedback circuit further includes code dithering circuitry.

In some aspects, the temperature controller includes an element that introduces a phase shift in the ring resonator.

In some aspects, the temperature controller includes at least one of a resistor, a p-n junction and a p-i-n junction.

In some aspects, the detector detects light intensity of the ring resonator during periodic calibration periods.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

DETAILED DESCRIPTION

Many photonics components such as ring/disk resonators are sensitive to fluctuations (e.g., temperature fluctuations) which cause them to perform sub-optimally. For instance, to maintain consistent modulation of an input optical signal, the temperature of a ring/disk resonator should be maintained within a narrow range of temperature. In high-precision applications, this can require control within less than 0.001 degrees Celsius. Traditional thermal monitoring on semiconductor devices uses thermal diodes. However, these devices often cannot accurately measure to a desired level of precision.

Measurements of the performance of an optical system may involve detection of current fluctuations in the nano-ampere range. However, it is impractical to use these signals directly in electrical feedback circuits, as the noise floor of such systems is typically above the level of the fluctuations causing the signals of interest to be buried in the noise. Additionally, amplifier designs in conventional stabilizing ring resonators are incapable of controlling a ring/disk resonator with high precision. The inventors have recognized and appreciated that conventional techniques for stabilizing photonics components such as ring/disk resonators with high precision can be improved. To this end, some embodiments are directed to circuitry and techniques for providing high-sensitivity detection and high-precision modulation control of a photonics component.

Figure 1:
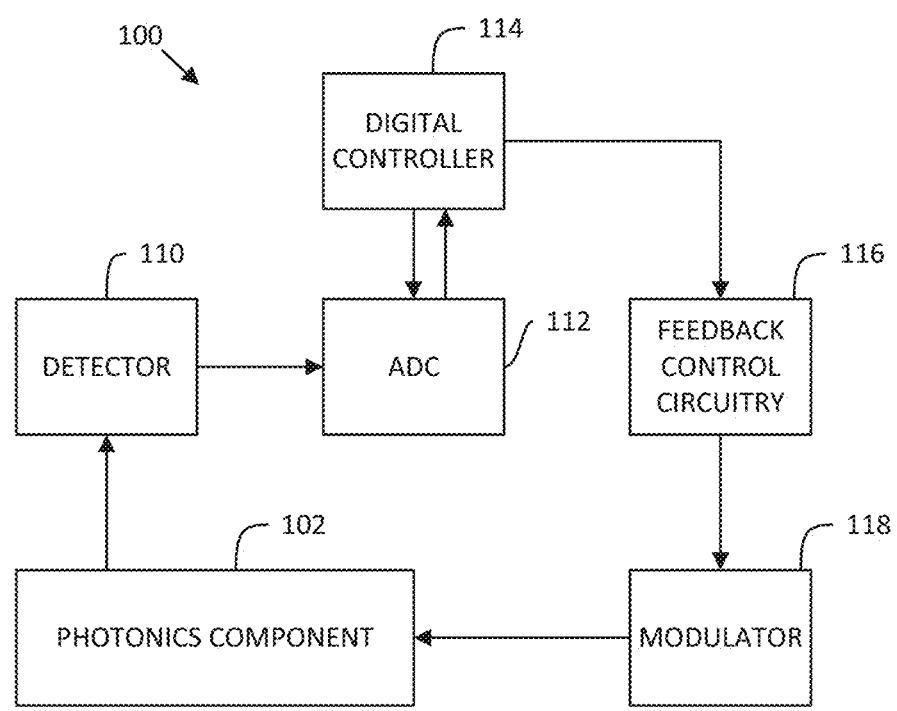
FIG. 1 illustrates a block diagram of a system for stabilizing a photonics component in accordance with some embodiments.

FIG. 1 illustrates a block diagram of a system 100 for stabilizing one or more aspects (e.g., temperature, phase) of a photonics component 102. An example of photonics component 102, described in more detail below, is a ring/disk resonator. It should be appreciated, however, that the detection and feedback control circuitry described herein may alternatively be used with other photonics components for which precise temperature control or phase stabilization is desired, including, but not limited to, photonic crystal cavities and Mach-Zehnder interferometers. Additionally, although a ring-shaped device is described as one example of a photonics component 102, it should be appreciated that photonics devices having cavities with shapes other than a ring may alternatively be used with the stabilization circuitry described herein.

System 100 includes a detector 110 configured to measure a characteristic of interest of photonics component 102 that may vary as a function of time. For instance, in some embodiments detector 110 is configured to detect a photocurrent representing power being transmitted in a ring/disk resonator. Any suitable detector 110 capable of providing a signal proportional to an amount of detuning (e.g., fluctuations in some characteristic over time) of the photonics component 102 may be used.

System 100 also includes analog-to-digital (ADC) circuitry 112, which converts an analog signal generated by detector 110 into a digital signal (e.g., a digital bit string) that can be used for setting a feedback control signal. In some embodiments, one or more components of ADC circuitry 112 are configurable based on signals received from digital controller 114, as described in more detail below. In addition to providing analog-to-digital conversion, ADC circuitry 112 may include one or more components to remove an offset component of an input analog signal and/or provide amplification to improve the signal to noise ratio of the input analog signal by expanding the signal within a desired dynamic range. The digital signal output from ADC 112 is provided to digital controller 114, which uses the digital signal from the detection process to set one or more feedback control parameters for tuning the photonics component 102.

System 100 also includes feedback control circuitry 116 configured to receive control signals from digital controller 114 and generate control output with high precision. The high-precision control output is used to control modulator 118 to stabilize the characteristic of interest (e.g., temperature, phase) of the photonics component 102.

Figure 2:
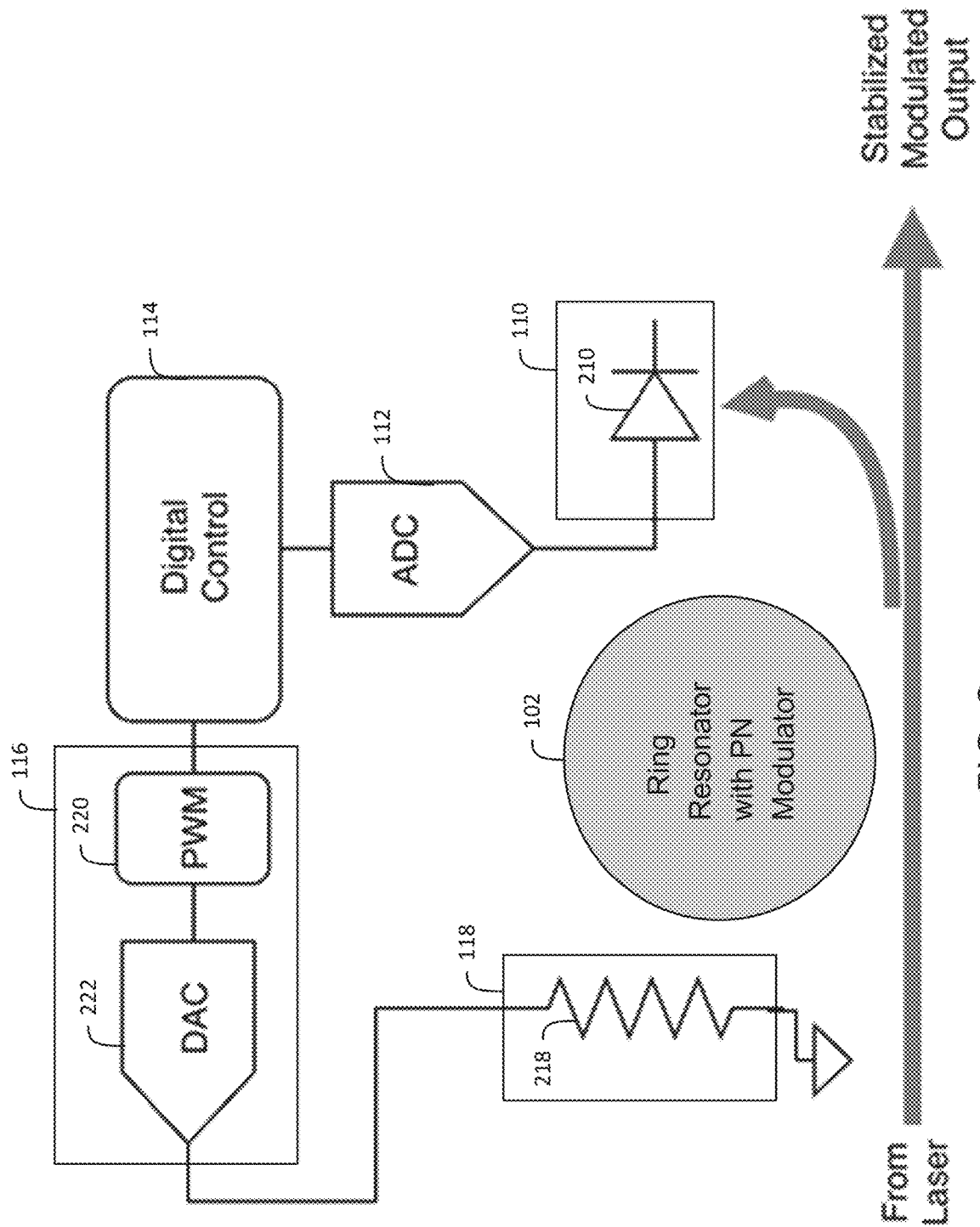
FIG. 2 illustrates a schematic diagram of a system for stabilizing a ring/disk resonator in accordance with some embodiments.

FIG. 2 schematically illustrates an implementation of system 100 in which the photonics component 102 to be stabilized is a photonics-based ring/disk resonator. As shown, the ring/disk resonator is coupled to an input waveguide that receives light from a laser and produces a stabilized modulated output. Detector 110 is implemented using an opto-electric element 210, an example of which is a photodetector (e.g., a photodiode). When the resonator is perfectly tuned, no light will be detected by the photodiode. However, when the resonator is detuned (e.g., due to temperature fluctuations or manufacturing variations), some power will be transmitted by the resonator, which will be detected by the photodiode. The opto-electric element 210 may include or be associated with an integrating element (e.g., a capacitor) that integrates electrical current or voltage over time in response to the detected light. The integrated electrical current or voltage may then be further processed by components of ADC circuitry 112 as described in more detail below.

The opto-electric element 210 may be configured to measure the intensity of light received during periodic calibration vectors provided as input to the system. The calibration vectors may be sent often enough that temperature adjustments can be made to keep up with any global temperature shifts. For instance, the calibration vectors may be sent every 10 μs, every 100 μs, every 1 ms, or at any other suitable time interval between 10 μs-1 ms. The light intensity is captured by the opto-electric element 210 via an observation port of the ring/disk resonator. In this way, a small amount of light is taken out of the optical system for this measurement. Since the amount of light is small, the associated electrical signal is also very small—typically on the order of micro amperes.

Opto-electric element 210 may be arranged to detect light from the ring/disk resonator in any suitable way. For instance, instead of being located near the point of coupling with the input waveguide as shown in FIG. 2, the opto-electric element 210 may be located to detect light at some other point of the ring/disk resonator.

The system shown in FIG. 2 includes analog-to-digital converting (ADC) circuitry 112 that receives as input the electrical signal from the opto-electric element 210 and converts the input electrical signal to a digital signal.

Due to the small amplitude of the detected electrical signal, ADC circuitry 112 may include circuitry to amplify the input signal and/or perform other processing, such as subtraction of an offset (e.g., baseline) component, as discussed in more detail below. In some embodiments, ADC circuitry 112 includes a current-mode dual-slope integrating ADC (IADC) with analog baseline subtraction, an example of which is shown in more detail in FIG. 3, described below. The IADC is configured to output a highly accurate digitized signal with current sensitivity in the nanoampere range. The current-mode feature of the IADC architecture facilitates direct integration of the ADC circuitry 122 with other components of a photonics system. The integrating topology averages out undesired high-frequency noise over the integration window, which increases the detection sensitivity of the system. The resulting dual-slope architecture of the IADC circuitry makes the design insensitive to process variations of the integrator, which increases accuracy.

The output of ADC circuitry 112 is a digital bit string that is provided as input to digital controller 114. The digital controller 114 operates on the digital bit string to determine a control signal to send to feedback control circuitry 116. In some embodiments, digital controller 114 is implemented as a counter, an example of which is described in connection with FIGS. 3 and 4.

The control signal output from the digital controller may be a digital pulse sequence, which is provided to feedback control circuitry 116 to control the time average power delivered to modulator 118. In some embodiments, the pulse width and/or the duty cycle of the digital pulse sequence is determined based, at least in part, on the magnitude of the digital bit string input to the digital controller. The feedback control circuitry 116 is configured to drive a voltage into the modulator 118 in order to control a characteristic of the ring resonator 102. In the implementation of FIG. 2, the modulator 118 is implemented as a resistor which generates heat to control the temperature of the ring resonator. The amount of heat generated by the resistor is based on measurements taken by the ADC circuitry 112, as discussed above. In some embodiments, modulator 118 may be implemented using one or more components other than a resistor including, but not limited to, a p-n junction and a p-i-n junction.

In order to maintain tight control over the temperature of the ring, in some embodiments the feedback control circuitry 116 has a precision on the order of 1 part per 50000 in power applied. The inventors have recognized that conventional high-precision DACs are incapable of meeting this performance requirement due to their sensitivity to noise. The large area required for their implementation, their slow operation speed, and the large amount of power required to operate them are also undesirable properties of conventional high-precision DACs, which render them unsuitable for use in high-precision feedback control systems such as those described herein.

Instead of using a high-precision DAC to drive the modulator 118, some embodiments use a combination of lower-precision circuitry and digital coding techniques to achieve a high precision of control. As shown in FIG. 2, feedback control circuitry 116 includes pulse width modulation (PWM) circuitry 220 and a low-precision (e.g., 8-bit) digital-to-analog converter (DAC) 222. The precision of the control scheme is determined based on a combination of the precision of the PWM circuitry 220 and the precision of the DAC 222, thereby permitting a less precise DAC to be used to achieve a high precision output. PWM circuitry 220 receives as input a digital pulse sequence from digital controller 114. For instance, with an 8-bit PWM period, there are 256 ($2^8$) bins, each of which may include a value of 0 or 1 in the input digital pulse sequence. Accordingly, the modulator can be controlled in 1/256 increments over a 2.560 μs period, thereby adding 8 bits of precision to the feedback control circuitry output. It should be appreciated that an 8-bit PWM period is merely one example of a PWM period that may be used and larger (or smaller) PWM periods may alternatively be used, provided that the thermal time constant of the system exceeds the total PWM period. When used in combination with a low-precision (e.g., 8-bit) DAC 222, the total precision of the feedback control output is the sum of the precision provided by PWM circuitry 220 and the DAC 222 (e.g., 16 bits), resulting in a fine-grained control of temperature regulation for the ring/disk resonator.

In some embodiments, digital coding schemes are used to further increase the high precision of feedback control circuitry 116. An example of such a digital coding scheme is code dithering. In embodiments that include code dithering, the PWM circuitry 220 alternates between outputting adjacent DAC codes at high frequency. For instance, at each PWM cycle, PWM circuitry 220 is configured to determine whether to drive code=N or code=N+1. Digital controller 114 is configured to control the percentage of time spent on code=N versus code=N+1, and the dithered output achieves extremely high precision with a much less precise DAC. The electrical and thermal systems that are being controlled provide a low pass filter that automatically averages out the dithered code such that the resulting tuning applied to the system can meet the desired precision requirements (e.g., 1 part per 50000 in power applied).

Modulator 118 is shown in the implementation of FIG. 2 as a resistor that is driven with high precision to generate heat to control the temperature of the ring/disk resonator. It should be appreciated, however, that modulator 118 may be implemented using other components designed to provide different modulation techniques including, but not limited to, electron dispersion and Kerr nonlinearity.

Figure 3:
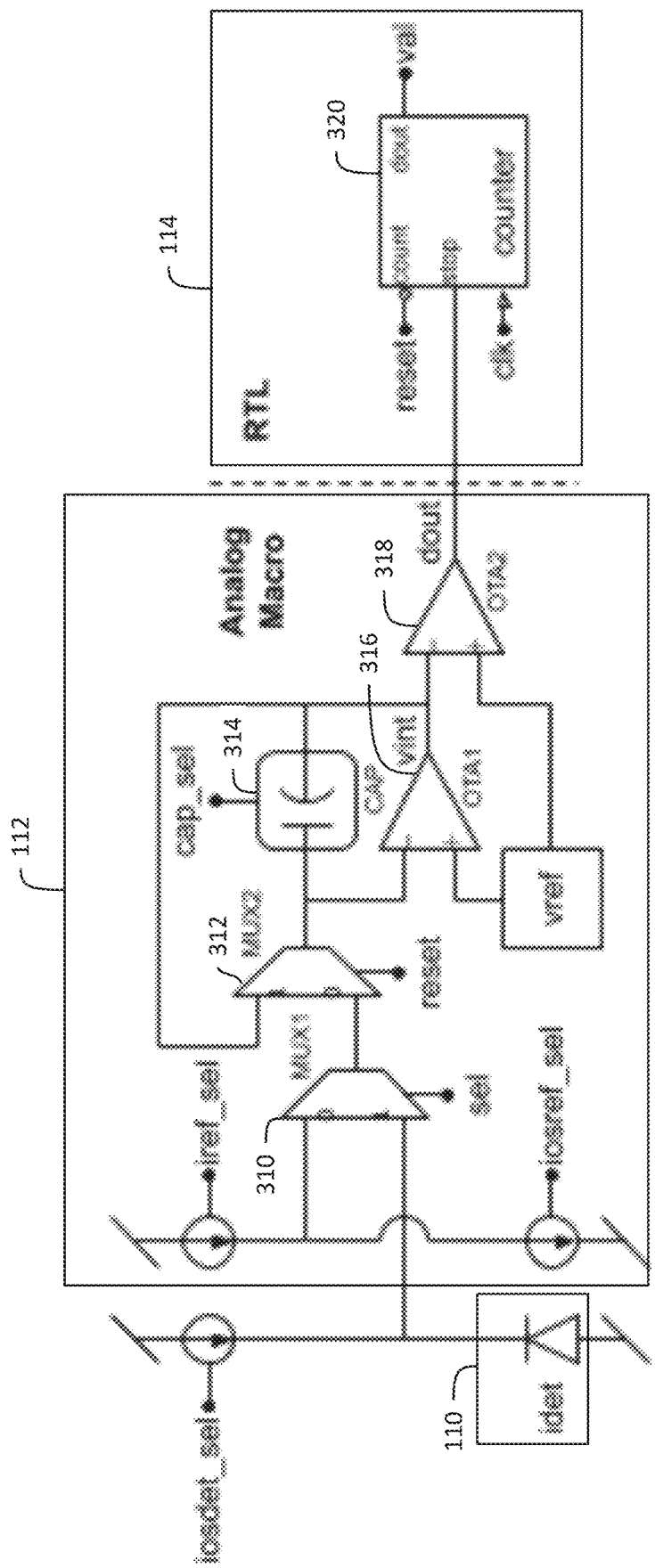
FIG. 3 illustrates analog-to-digital conversion circuitry used in accordance with some embodiments.

FIG. 3 illustrates exemplary IADC circuitry that may be included in ADC circuitry 112. As shown, ADC circuitry 112 includes a pair of analog multiplexers (MUX1 310, MUX2, 312), which steer the input current from the opto-electric element 210 onto an integrating capacitor 314 for a fixed amount of time. For instance, the integrating capacitor 314 may have a value on the order of 10-20 pF, and the integration time may be set within a range of 1-10 μs (e.g., 2 μs).

ADC circuitry 112 also includes a pair of operational transconductance amplifiers (OTA1 316, OTA2 318). For instance, OTA1 and OTA2 may be high-gain low-voltage folded cascode OTAs, where OTA1 and capacitor 314 is configured as a feedback integrator and OTA2 is configured as an open-loop comparator (or zero-crossing detector). Vref is a DC reference voltage (e.g., 500 mV) generated by a low-voltage bandgap reference circuit that serves as a virtual ground in the single-supply OTA.

Figure 4:
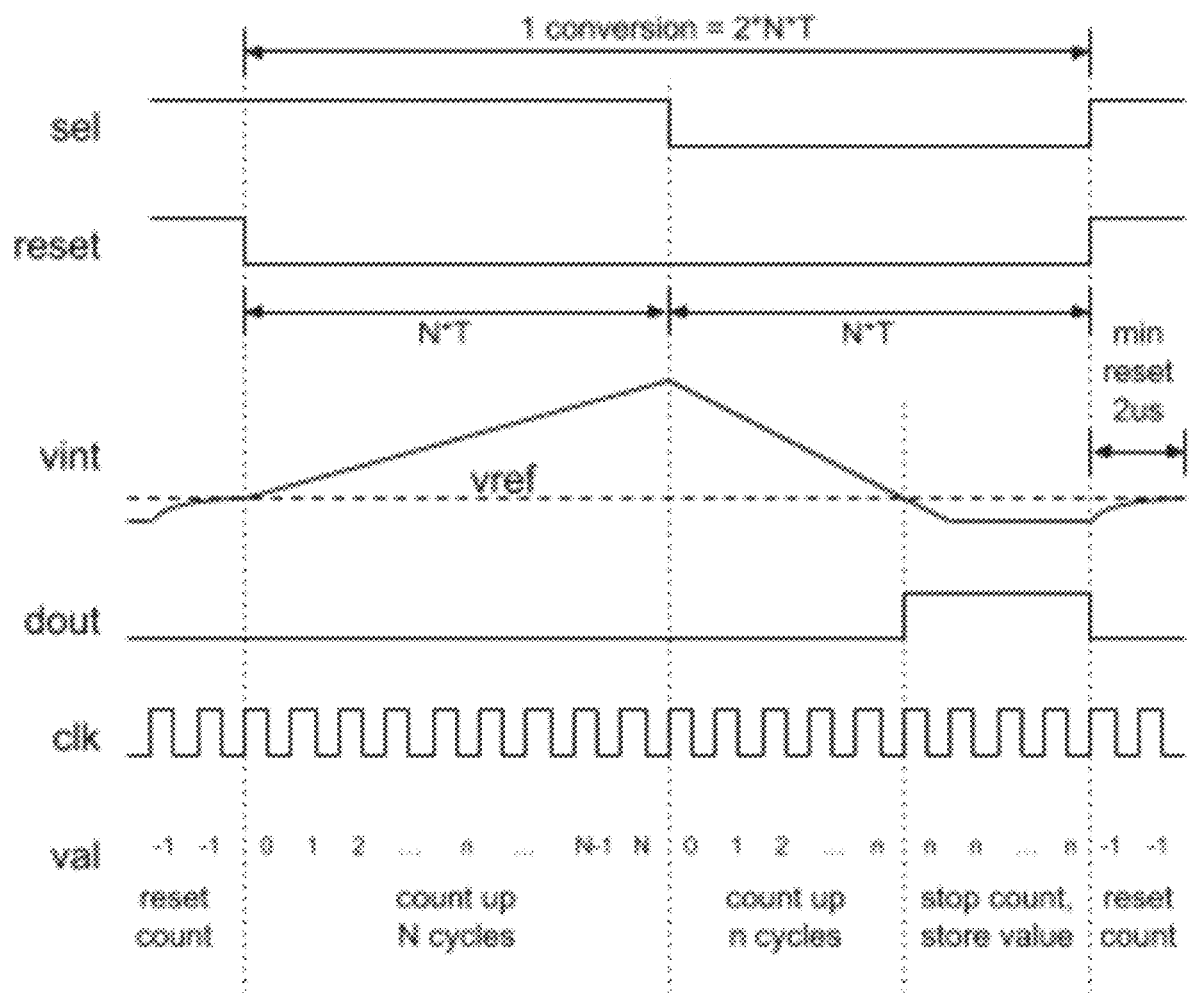
FIG. 4 illustrates a timing diagram for control signals generated by a digital controller in accordance with some embodiments.

In the circuitry of FIG. 3, the digital controller 114 is implemented using a counter 320. FIG. 4 describes a timing diagram for one ADC conversion period of the IADC circuitry shown in FIG. 3. The timing diagram includes control signals generated by the counter 320 to control components of the IADC circuitry in accordance with some embodiments. For instance, the timing of the input signals provides different charge/discharge times of the integrating capacitor 314 to allow precise measurement of the input current.

In some embodiments, the IADC circuitry shown in FIG. 3 is configured to operate in accordance with the timing diagram shown in FIG. 4 as follows. Initially, a reset signal (reset) is asserted to reset both the integrator 314 output voltage and the counter 320 value to zero, respectively. At the start of an ADC conversion cycle, the reset signal is first deasserted to enable the integrator 314. Similarly, a select signal (sel) is asserted to indicate the onset of an integration phase, in which a positive DC input photocurrent (idet), is provided to the integrator 314 for a duration of N=400 5-ns clock cycles, or an equivalent integration period (T) of 2 μs. During this time, the integrator 314 produces a linear voltage up-ramp on node vint, with a positive slope proportional to the ratio of input current. At the end of the integration phase, the voltage at node vint is given by: vint=(idet/Cint)*T, where Cint is the integration capacitance (e.g., 16 pF). Subsequently, the signal sel is deasserted to indicate the start of a de-integration phase, in which a constant negative reference current (iref) is provided to the integrator 314. During this time, a digital up-counter begins to count while the integrator 314 produces a linear voltage down-ramp on node vint, with a constant negative slope. When the voltage on node vint reaches zero, a comparator 318 produces a zero-crossing detect signal on node dout that stops the counter 320. At this time, the existing counter value becomes the output code, which is stored in memory. The output code is given by D=ceil[N*(idet/iref)], where 0<idet/iref<1. At the end of the de-integration phase, the reset signal (reset) is asserted to reset the integrator 314 and counter 320, indicating the end of the conversion cycle.

The inventors have recognized that the small detected current representing temperature fluctuations in the ring/disk resonator is buried by a large DC baseline current. Some embodiments include circuitry to at least partially remove this DC baseline current prior to amplification, thereby improving accuracy and extending the dynamic range of the system. Instead of resolving the undesired baseline current at every conversion with a high-resolution system, a similar high precision result may be achieved with a much less precise ADC by removing the redundant baseline before conversion to resolve a smaller number of bits by design. In some embodiments, this is accomplished by generating a programmable temperature-insensitive bandgap current reference to cancel the unwanted DC baseline as follows. A current cancellation scheme can further improve dynamic range by subtracting DC offset currents (iosdet and iosref) from both input (idet) and reference (iref) currents, respectively. In this case, the output code is given by: $D=\text{ceil}[N*(\text{idet}-\text{iosdet})/(\text{iref}-\text{iosref})]$, where $0<(\text{idet}-\text{iosdet})/(\text{iref}-\text{iosref})<1$. Proper selection of the offset currents maximizes the term (idet−iosdet)/(iref−iosref) to be close to unity, which in turn maximizes ADC output code, thus enhancing the dynamic range of the system. The combination of subtracting the DC baseline followed by amplifying the remaining input current signal to fill up the dynamic range of the ADC provides high-precision detection circuitry using low precision components.

Rather than being a passive ADC system, some embodiments use control signals output from the digital controller 114 to control various aspects of how ADC circuitry 112 operates. For instance, digital controller 114 may set the slope or rate of the integration using control signal cap_sel. Digital controller 114 may also provide other control signals to ADC circuitry 112 including an iosdet_sel signal to select the DC offset current (iosdet) to subtract during integration; an iosref_sel signal to select the DC offset current (iosref) to subtract during de-integration; a sel signal provided to MUX 310 to select between integration and de-integration phases; and a reset signal provided to MUX 312 to reset the voltage on the integrating capacitor 314 after an integration period.

Figure 5:
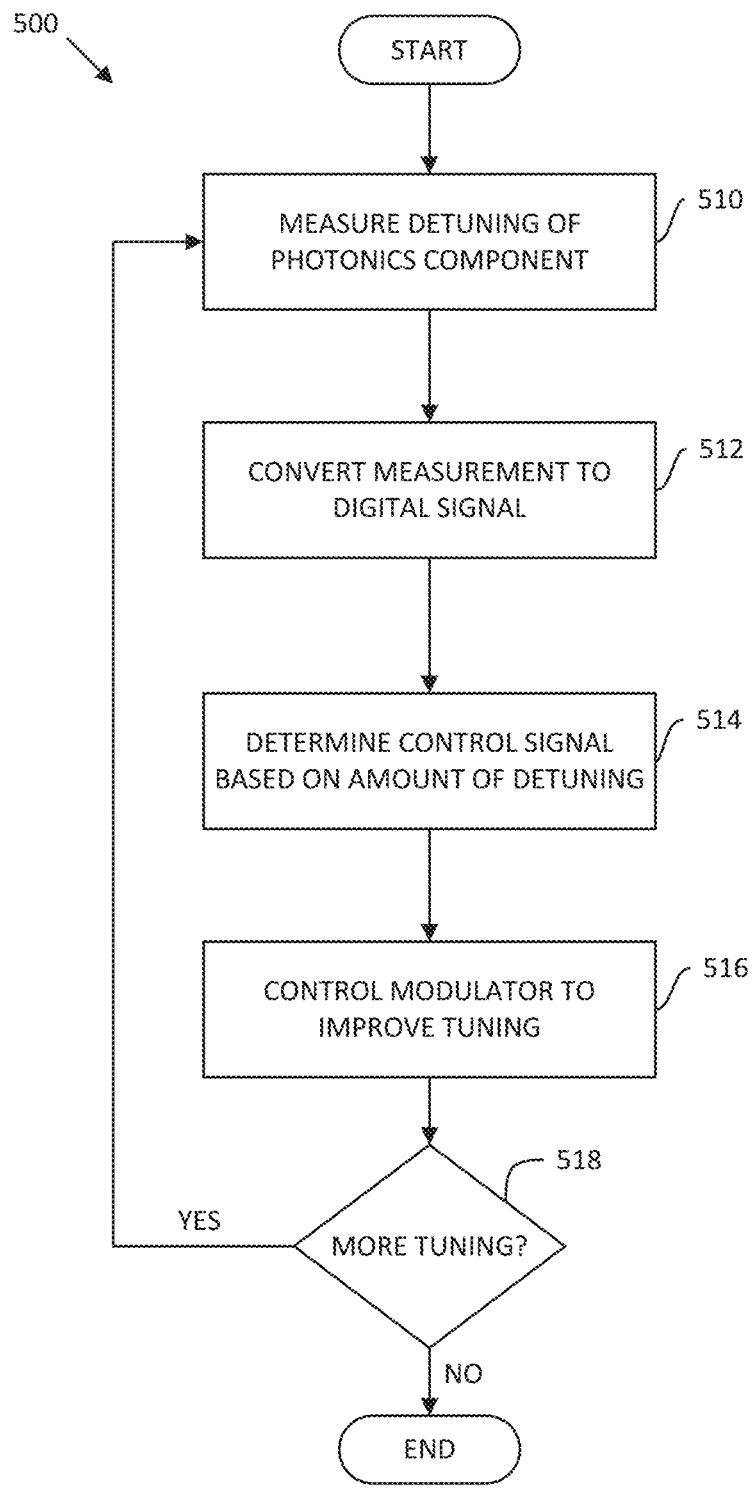
FIG. 5 illustrates a flowchart of a process for stabilizing a photonics component in accordance with some embodiments.

FIG. 5 illustrates a process 500 for providing high-precision feedback control of a modulator to provide stabilization for a photonics-based component in accordance with some embodiments. In act 510, a detuning of the photonics-based component is measured. For instance, in the example system described above, a photodiode is used to measure a small amount of light extracted from a ring/disk resonator to determine whether the performance of the resonator has changed from an optimal (resonant) state due to temperature fluctuations. Process 500 then proceeds to act 512, where the analog electrical signal (e.g., current) produced by the detector is converted into a digital signal for processing by a digital controller. As described above, in some embodiments, the input electrical signal is processed (e.g., by subtracting an offset value, by performing amplification, etc.) prior to conversion into a digital signal.

Process 500 then proceeds to act 514, where the digital controller generates a control signal based, at least in part, on the amount of detuning coded in the digital signal produced by the ADC circuitry. For instance, in the example described above, the digital controller produces a digital pulse sequence that is provided as input to feedback control circuitry. Process 500 then proceeds to act 516, where the feedback control circuitry is used to control a modulator to improve the tuning of the photonics component. In the example described above, the modulator is a resistor configured to generate heat in response to a current applied to the resistor. The feedback control circuitry controls the time average power provided to the resistor to compensate with high precision for temperature fluctuations detected by the detector.

Process 500 then proceeds to act 518, where it is determined whether additional tuning of the photonics component is desired. If it is determined that no further tuning is desired, process 500 ends. Otherwise, process 500 returns to act 510 where a new measurement of the detuning of the photonics component is performed, and the process repeats until it is determined in act 518 that tuning of the photonics component is no longer desired.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

The invention claimed is:

1. A device, comprising:
    an opto-electrical detector configured to output a first electrical signal based on a measurement of light intensity of a photonics-based component, the light intensity being proportional to an amount of detuning of the photonics-based component;
    analog-to-digital conversion (ADC) circuitry configured to generate a second electrical signal by subtracting an offset value from the first electrical signal output from the opto-electrical detector, and to output a digital signal based on the second electrical signal; and
    feedback control circuitry configured to tune the photonics-based component based, at least in part, on the digital signal output from the ADC circuitry; and
    a digital controller configured to:
        receive the digital signal output from the ADC circuitry;
        generate a digital pulse sequence based, at least in part, on the received digital signal; and
        provide the digital pulse sequence to the feedback control circuitry.

2. The device of claim 1, wherein the photonics-based component is a ring resonator.

3. The device of claim 1, wherein
    the photonics-based component includes a viewport, and
    the opto-electrical detector comprises a photodetector configured to detect a light intensity through the viewport.

4. The device of claim 1, wherein the ADC circuitry further comprises an integrating capacitor configured to integrate at least a portion of the second electrical signal output from the opto-electrical detector prior to conversion to a digital signal.

5. The device of claim 4, wherein the digital controller is further configured to set an integration time of the integrating capacitor.

6. The device of claim 4, wherein the ADC circuitry further comprises multi-stage amplification circuitry configured to amplify a voltage stored by the integrating capacitor.

7. The device of claim 1, wherein the ADC circuitry comprises a dual-slope integrating ADC.

8. The device of claim 1, wherein the feedback control circuitry comprises pulse width modulation (PWM) circuitry coupled to a digital-to-analog converter (DAC).

9. The device of claim 8, wherein the DAC has a resolution less than or equal to 8-bits.

10. The device of claim 8, wherein the PWM circuitry is configured to perform code dithering.

11. The device of claim 1, wherein the feedback control circuitry is configured to tune the photonics-based component by controlling a temperature of the photonics-based component.

12. The device of claim 11, wherein the feedback control circuitry is configured to control the temperature of the photonics-based component by introducing a phase shift in the photonics-based component.

13. The device of claim 11, wherein the feedback control circuitry includes a modulator that provides at least one of an electro-optic effect and a thermal phase shift in the photonics-based component.

14. The device of claim 13, wherein the modulator includes at least one of a resistor, a p-n junction, and a p-i-n junction.

15. The device of claim 1, wherein the feedback control circuitry is configured to accurately control a temperature of the photonics-based component to within 0.001 degrees Celsius.

16. The device of claim 1, wherein the feedback control circuitry is configured to have a precision of one part per 50000 in applied power.

17. The device of claim 1, wherein the feedback control circuitry is configured to tune the photonics-based component based on a time-averaged power generated by the feedback control circuitry.

18. A method of stabilizing a photonics-based component, the method comprising:
    generating a first electrical signal based on a detected light intensity proportional to an amount of detuning of the photonics-based component;
    subtracting, from the first electrical signal, an offset value to produce a second electrical signal;
    amplifying the second electrical signal;
    generating a digital signal based on the amplified second electrical signal; and
    tuning the photonics-based component based, at least in part, on the generated digital signal.

19. The method of claim 18, wherein the photonics-based component is a ring resonator.

20. The method of claim 18, further comprising:
    generating a digital pulse sequence based, at least in part, on the digital signal; and
    tuning the photonics-based component based, at least in part, on the generated digital pulse sequence.

21. The method of claim 18, further comprising:
    integrating at least a portion of the first electrical signal prior to generating the digital signal.

22. The method of claim 21, further comprising:
    dynamically setting an integration time during which the integrating of the first electrical signal is performed.

23. The method of claim 18, wherein amplifying the second electrical signal comprises performing multi-stage amplification.

24. The method of claim 18, further comprising:
    performing code dithering based on the generated digital signal.

25. The method of claim 18, wherein tuning the photonics-based component comprises controlling a temperature of the photonics-based component.

26. The method of claim 25, wherein controlling the temperature of the photonics-based component comprises introducing a phase shift in the photonics-based component.

27. The device of claim 1, wherein the photonics-based component comprises a resonator evanescently coupled to a bus waveguide, and wherein the opto-electrical detector is coupled to the waveguide such that, when the resonator is perfectly tuned, substantially no light is detected by the opto-electrical detector.

* * * * *